United States Patent [19]
Holt

[11] Patent Number: 4,858,955
[45] Date of Patent: Aug. 22, 1989

[54] PALETTE WITH DISPOSABLE MIXING SURFACE FOR MIXING BLENDABLE MATERIALS

[76] Inventor: George G. Holt, P.O. Box 3244, Morristown, Tenn. 37814

[21] Appl. No.: 185,142

[22] Filed: Apr. 22, 1988

Related U.S. Application Data

[63] Continuation-in-part of Ser. No. 939,814, Dec. 9, 1986, Pat. No. 4,740,014.

[51] Int. Cl.[4] ........................ B42D 5/00; B42D 17/00; G09B 11/10; B44D 3/00

[52] U.S. Cl. ........................................ 281/44; 281/45; 434/84; 206/1.7

[58] Field of Search ................. 281/15 B, 42, 45, 3 A; 433/49; 366/602, 605; 248/441.1; 206/1.7; 434/84; 401/268

[56] References Cited

U.S. PATENT DOCUMENTS

| | | | |
|---|---|---|---|
| 3,271,091 | 9/1966 | Henry | 434/84 |
| 3,424,300 | 1/1969 | Penniman, Jr. | 206/1.7 |
| 3,856,136 | 12/1974 | Governale | 206/1.7 |
| 3,945,490 | 3/1976 | Thompson | 206/1.7 |
| 4,142,627 | 3/1979 | Szegi | 206/1.7 |
| 4,586,730 | 5/1986 | Shulyak | 281/45 |
| 4,740,014 | 4/1988 | Holt | 281/15 B |

FOREIGN PATENT DOCUMENTS

| | | | |
|---|---|---|---|
| 5207 | of 1912 | United Kingdom | 434/84 |
| 655794 | 8/1951 | United Kingdom | 434/84 |

*Primary Examiner*—Frank T. Yost
*Assistant Examiner*—Paul M. Heyrana, Sr.
*Attorney, Agent, or Firm*—Pitts and Brittian

[57] ABSTRACT

A palette for providing a surface upon which a user can mix blendable materials, such as vehicle body repair fillters, with a mixing instrument is disclosed. The palette includes a base (12) which, in a preferred embodiment, is a substantially rectangular planar member. To allow the palette to be steadily held during use, a stabilizing apparatus (14) is provided which allows the user to steadily hold the palette and which includes, in a preferred embodiment, two thumb holes (20 and 20A) and a cut-out (18) defined by the base (12). To receive the materials to be blended, a pad (24) of disposable mixing sheets (26) is secured to the base (12). Each of the disposable mixing sheets (26) is releasably bonded to the other sheets (26). To allow the sheets (26) to be separated from the pad (24) after use, a finger hole (42) is defined by the base (12) proximate an unbonded portion (32) of the pad (24) whereby the user may grasp and lift the sheets (26). A clip (38) is provided for securing a mixing instrument to the base (12) of the palette when such instrument is not in use.

5 Claims, 2 Drawing Sheets

PALETTE WITH DISPOSABLE MIXING SURFACE FOR MIXING BLENDABLE MATERIALS

DESCRIPTION

This is a Continuation-In-Part application based upon a parent application Ser. No. 939,814, filed by the applicant on Dec. 9, 1986, to be issued as U.S. Pat. No. 4,740,014, on Apr. 26, 1988.

1. Technical Field

This invention relates generally to palettes which provide a surface upon which a user can mix blendable materials, and more particularly to palettes which provide a surface upon which a user can mix substances such as vehicle body repair fillers with a mixing instrument. In this particular invention, the palette includes unique methods and apparatus for providing a disposable mixing surface.

2. Background Art

Prior to applying substances such as vehicle body repair fillers, epoxy, silicon compounds, and like substances to a vehicle to be repaired, the body repair person must mix these blendable repair materials. The palettes presently available for providing a surface upon which to mix these materials are typically non-disposable palettes or disposable, usually hand made, palettes crudely cut from corrugated cardboard boxes.

A primary drawback of the non-disposable palettes is the difficulty inherent in cleaning repair materials from them, particularly after those materials have hardened. The standard cleaning methods, including scraping, sanding, grinding, or washing with solvents, are time consuming; and these methods frequently result in damage to the palette. Additionally, several of these methods are undesirable in that they produce dust or other hazardous by-products, such as flammable waste solvents.

As to the prior art disposable palettes, these palettes are typically constructed of corrugated cardboard cut by the body repair persons. This process is not only time consuming, but the cut edges are often crooked, making it difficult to evenly apply the blendable materials to the mixing instrument. Additionally, corrugated cardboard is bendable by nature and thus is not suitable for withstanding the rigors of use in vehicle repair. Moreover, cardboard has a porous and loose surface and thus both readily absorbs the materials being mixed upon it and easily flakes during mixing and use such that cellulose fibers from the cardboard combine with and contaminate the repair mixtures, thus impairing the durability, finish and strength of the repair. Additionally, due to the bulkiness of cardboard, storage and disposal of a supply of cardboard palettes can be a problem.

Since it is desirable to have a ready-to-use, disposable surface for mixing blendable materials, such as vehicle body repair fillers, one object of the present invention is to provide a palette with disposable mixing sheets.

It is a further object of the present invention to provide a palette which is sufficiently durable so as to withstand the rigorous use of mixing body repair fillers and of being used in connection with applying those fillers to a vehicle.

Another object of the present invention is to provide a disposable surface constructed of materials which will neither absorb the blendable materials nor contaminate those materials.

Yet another object is to provide a palette with a disposable mixing surface which is compact and thus relatively easy to store and to discard.

A still further object is to provide a palette with disposable mixing sheets which can be manufactured using a relatively inexpensive process and which will thus be cost effective for use in vehicle repair shops.

DISCLOSURE OF THE INVENTION

Other objects and advantages will in part be obvious, and will in part appear hereinafter, and will be accomplished by the present invention which provides apparatus and methods for providing a palette with a disposable mixing surface upon which a user can mix blendable materials, such as vehicle body repair fillers, with a mixing instrument. The palette comprises a base, such as, for example, a substantially planar member. A stabilizing means is provided for allowing the palette to be steadily held during use. In a preferred embodiment, this stabilizing means includes a gripping means, such as a thumb hole defined by the base for allowing the user to hold the palette during use and also includes a cut-out defined by the base which allows the user to steady the palette by placing the cut-out against his body. Secured to the base, a mixing surface means is provided for receiving the materials to be blended, with this mixing surface means comprising a pad of disposable mixing sheets. Each of the disposable mixing sheets is releasably bonded to the other sheets, such as by perimeter bonding, for example, such that the top mixing sheet can be torn from the pad after use to provide a clean mixing surface. In a preferred embodiment, the palette also comprises a means for separating the top sheet from the pad, which includes, for example, a unbonded portion of the perimeter of the pad whereby the user may easily grasp and lift the top sheet.

In another embodiment of the present invention, an additional thumb hole is provided proximate the above-described cut-out to facilitate the user steadily resting the palette on the user's forearm. A finger hole is also provided proximate the unbonded portion of the pad as an additional feature of the sheet separation means to facilitate the grasping and lifting of the last few sheets in the pad. In this embodiment, a clip is provided for securing a mixing instrument to the base of the palette when such instrument is not in use.

BRIEF DESCRIPTION OF THE DRAWINGS

The above-mentioned features of the present invention will be more clearly understood from the consideration of the following description in connection with the accompanying drawings in which.

BEST MODE FOR CARRYING OUT THE INVENTION

Figure 1:
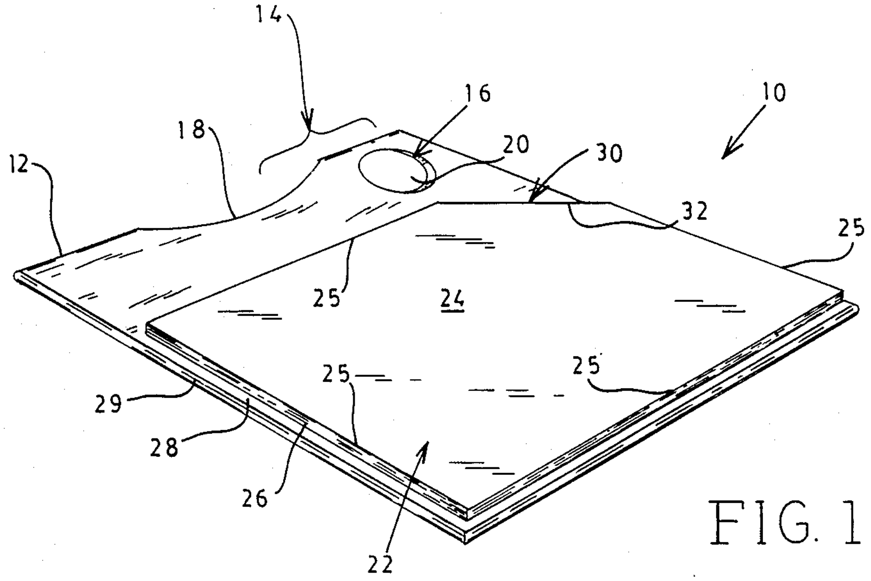
FIG. 1 is a pictorial view of the features of one embodiment of the palette of the present invention wherein a selected portion of the perimeter of the pad is offset from a selected portion of the perimeter of the base.
Figure 3:
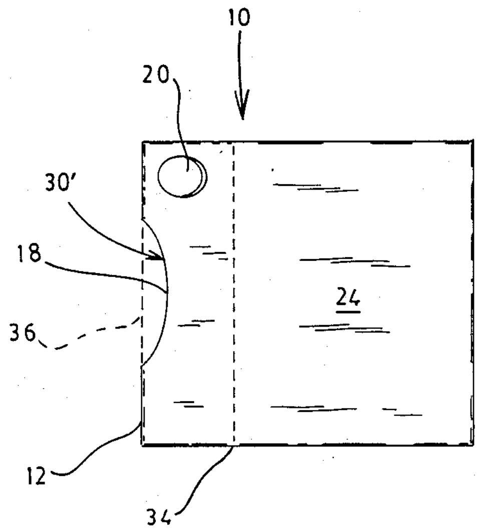
FIG. 3 is a top view of an alternate embodiment of the present invention wherein the perimeter of the pad and the perimeter of the base are coextensive, which figure further shows, by phantom line, an alternate embodiment wherein a selected portion of the perimeter of the pad and a selected portion the of the perimeter of the base are coextensive.

Referring now to FIG. 1, there is shown a pictorial view of one embodiment of the palette of this invention generally at 10. A base 12 is provided which, in a preferred embodiment as shown, is a substantially rectangular planar member. The base is preferably constructed of a substantially rigid and suitably durable material such as wood, pressboard, heavy cardboard, or the like. To allow the user to hold the palette steadily during use, a stabilizing means shown generally at 14 is provided. In the embodiment shown, the stabilizing means 14 includes a gripping means, shown generally at 16, and a cut-out 18. The gripping means 16 allows the user to hold the palette, and, in the illustrated embodiment, includes a thumb hole 20 defined by the base 12 and located proximate one corner of the base 12. It will, of course, be recognized, however, that the gripping means 16 need not be limited to the thumb hole 20 as illustrated, but may instead include a handle fixed to the base 12 or any other suitable means for allowing the user to hold the palette 10. In the illustrated embodiment, the stabilizing means also includes a cut-out 18 defined by the base 12 which serves to allow the palette 10 to be steadied during use by placement against the user's body and which, in a preferred embodiment, is an arc of selected radius centered along an edge of the base 12 (as shown in FIG. 3).

To receive the materials which are to be blended, the palette also includes a mixing surface means, shown generally at 22. As illustrated at FIG. 1, the mixing surface means 22 includes a pad 24 secured to the base 12 such as by gluing. The pad includes a plurality of disposable mixing sheets 26. Each of these mixing sheets 26 is releasably bonded to the other sheets 26 such as by gluing, around the perimeter edges 25 of the sheets 26. The sheets 26 preferably include non-porous materials, such as a plastic surface coating or the like, so as to prevent absorption of the blendable materials into the sheets 26. Additionally, these sheets 26 are preferably constructed such that the grains or fibers of the sheets 26 will resist flaking or other decomposition during use, so as to prevent contamination of the blendable materials by the sheets 26.

As illustrated, the pad 24 is substantially rectangular. This illustrated configuration of the pad 24 allows the pad 24 to be manufactured of standard-sized sheets so as to ease production and lessen costs; however, as will be recognized and as illustrated by FIG. 3, the sheets 26 are, of course, not limited to this illustrated rectangular configuration.

Also, as illustrated in the embodiment of FIG. 1, the pad 24 is selectively off-set from the base 12 so as to define an off-set portion 28 between the pad 24 on the surface of the base 12 and a base edge 29 which off-set provides a surface for allowing the user to scrape the mixing instrument against the rigid base 12 so as to control the amount of blendable material on the mixing instrument. As will, of course, be recognized and as will be explained hereinafter in the discussions of FIGS. 2 and 3, various means may be used to provide a surface against which the user can scrape excess blendable materials from the mixing instrument.

A preferred embodiment of the palette also includes a means for separating the top of the mixing sheets 26 from the pad 24, which separation means is illustrated generally at 30 in FIG. 1. As illustrated, this separation means includes truncated corners 32 of sheets 26 defined by the pad 24. The sheets 26 are unbonded at the truncated corners 32 so as to allow the user to grasp and lift one or more sheets 26, and to tear the sheets 26 from the rest of the pad 24. To simplify the bonding process and to lower production costs, the pad 24 would preferably be bonded around the entire perimeter, and then the truncated corner 32 would be cut from the pad 24, thereby exposing a limited unbonded portion to serve as the separation means 30.

As will be recognized and as will be explained by further example in the discussion of FIG. 3, various other separation means may be utilized, such as simply leaving a selected portion of the perimeter of the pad 24 unbonded. However, if an unbonded portion of the pad 24 is used as the separation means 30, it is preferable to limit the unbonded portion to a relatively small portion of the pad 24 such that the sheets 26 will not accidentally tear from the pad 24 during use.

Figure 2:
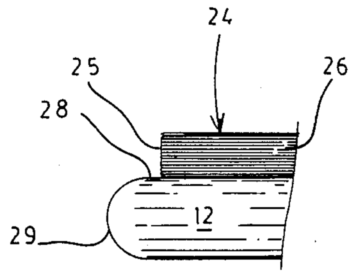
FIG. 2 is a cross-sectional view of an alternate embodiment of the base wherein the base defines at least one rounded base edge.

FIG. 2 illustrates an alternate embodiment of the base 12 wherein the base 12 defines at least one rounded base edge 29 which provides a surface against which the user may scrape excess blendable materials from the mixing instrument.

Referring now to FIG. 3, there is shown a top view of the present invention wherein a selected portion of the perimeter of the pad 24 is coextensive with the selected portion of the base 12, i.e., there is no off-set 28. In this embodiment, the edge of the pad 24 provides the surface against which the user may scrape excess blendable materials from the mixing instrument. The advantage of this embodiment is that the blendable materials will not touch the base 12, and the base 12 will thus not have to be later cleaned.

As illustrated by the phantom line at 34, it will, of course, be recognized that the pad 24 may only partially cover the base, such as by ending at phantom line 34, or the pad 24 may have a perimeter completely coextensive with the perimeter of the base 12. In the embodiment illustrated at FIG. 3 wherein the perimeters of the base 12 and the pad 24 are completely coextensive, the cut-out 18 and the thumb hole 20 are preferably defined by both the base 12 and the pad 24. The primary advantages of this embodiment are that the entire palette 10 would preferably be disposable and further that the base would preferably be constructed of heavy cardboard or other inexpensive yet suitably rigid material, thereby eliminating the need for any cleaning of the base 12, and further eliminating the process of affixing a new pad 24 to the base 12 when all the sheets 26 have been used.

Another advantage of this embodiment is the ease of manufacture, for the pad 24 would preferably be fixed to the base 12 in the same perimeter bonding process by which the sheets 26 are bound to one another. Also, an alternative separation means, shown generally at 30', could easily be produced by first manufacturing a substantially rectangular base 12 and pad 24 as illustrated in phantom at 36, with the base 12 and pad 24 being bonded along the entire perimeter, and then cutting away a portion of the base 12 and pad 24 so as to define an unbonded cut-out 18 which would serve the dual purpose of stabilizing the palette against the user's body and of allowing the user to grasp and lift one or more sheets 26 from the pad 24.

Figure 4:
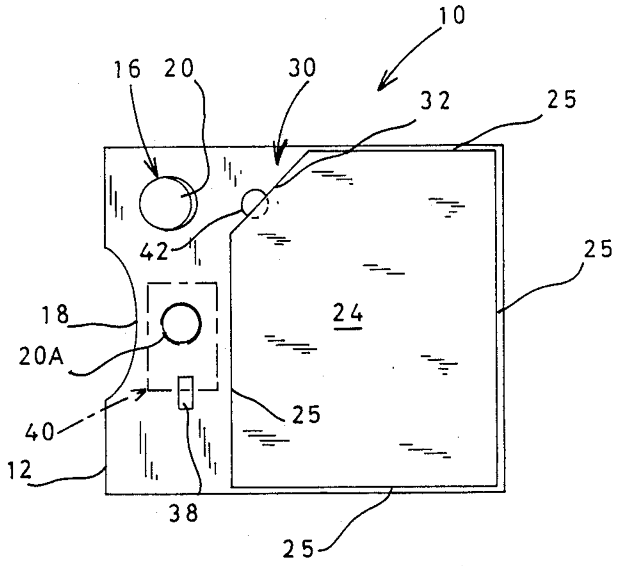
FIG. 4 illustrates a top view of an alternate embodiment of the present invention.
Figure 5:
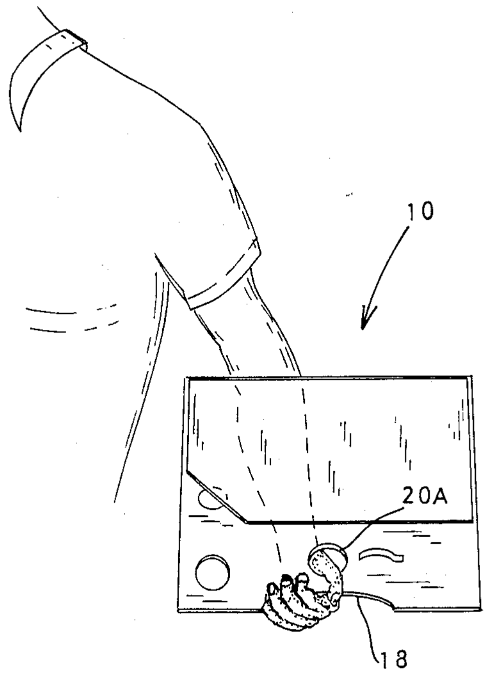
FIG. 5 is a pictorial of the alternate embodiment of the present invention shown in FIG. 4 which illustrates the use of one of the features of that embodiment.

Referring now to FIG. 4, there is shown a top view of an alternate embodiment of the palette of this invention generally at 10. In this embodiment, a rectangular pad 24 defining four side edges 25 and a truncated corner 32 is provided. A finger hole 42 is provided to facilitate the grasping and lifting of the last few of the disposable sheets shown at 26 in FIG. 1, from the pad 24. The finger hole 42 is located proximate the truncated corner 32 in the base 12 and preferably is at least partially overlaid by the truncated corner 32 of the pad 24. A second thumb hole 20A is provided proximate the cut-out 18 in the base 12. A user can place his or her thumb in the thumb hole 20A from the underside of the palette 10 and grip the palette 10 with the fingers of the same hand proximate the cut-out 18 to steady the palette 10 upon his or her forearm as illustrated in FIG. 5. A clip means of conventional construction is shown at 38 for securing a mixing instrument shown in phantom at 40 to the base 12 of the palette 10 when the mixing instrument 40 is not being used. In this embodiment, the sheets of the pad 24 are unbonded at the truncated corner 32 and along one side edge 25 adjacent to the truncated corner 32, preferably the top edge 25 when the palette 10 is viewed as shown in FIG. 4. It will, of course, be recognized that a palette of the present invention could be constructed utilizing any or all of the features shown in FIG. 4 in addition to those features illustrated in the other figures.

Thus, although the present invention has been described with respect to specific methods and apparatus for providing a palette with a disposable mixing surface upon which a user can mix blendable materials, such as vehicle body repair fillers, with a mixing instrument, it is not intended that such specific references be considered as limitations upon the scope of this invention except insofar as to set forth in the following claims.

I claim:

1. A palette for providing a surface upon which a user can mix blendable material with a mixing instrument, said palette comprising:

a substantially rigid planar base defining a perimeter;

a stabilizing means for allowing said palette to be steadily held during use, said stabilizing means including a cut-out defined in a portion of said perimeter of said base for steadying said palette against said user's body, and said base defining at least one thumb hole;

a mixing surface means for receiving said materials to be blended, said mixing surface means including pad secured to said base to prevent movement during mixing, said pad defining a perimeter and including a plurality of disposable mixing sheets, each of said sheets being releasably bonded to said other sheets along substantially all of said perimeter of said pad provided, however, a selected portion of said perimeter is unbonded; and sheet separation means at said selected unbonded perimeter portion whereby said user can grasp and remove at least one said sheet from said pad, said sheet separation means comprising a truncated corner of said pad, said sheets being unbonded at said truncated corner and said base defining a finger hole proximate and at least partially overlaid by said truncated corner thereby facilitating the grasping and removing of the last few of said sheets in said pad.

2. The palette of claim 1 wherein said stabilizing means further comprises said base defining a second thumb hole proximate said cut-out to facilitate said user's resting said palette across said user's forearm.

3. The palette of claim 1 wherein said palette further comprises clip means attached to said base for releasably securing said mixing instrument to said palette when said mixing instrument is not being used.

4. The palette of claim 1 wherein said sheet separation means further comprises a portion of the perimeter of said sheets adjacent to said truncated corner being unbonded.

5. A palette for providing a surface upon which a user can mix blendable material with a mixing instrument, said palette comprising:

a substantially rigid base defining a perimeter;

a stabilizing means for allowing said palette to be steadily held during use, said stabilizing means including a cut-out defined in a portion of said perimeter of said base for steadying said palette against said user's body, and at least two thumb holes defined in said base, one of said thumb holes being located proximate said cut-out for steadily resting said palette on a forearm of said user;

a mixing surface means for receiving said materials to be blended, said mixing surface means including a substantially rectangular pad secured to said base to prevent movement during mixing, said pad defining a perimeter and including a plurality of disposable mixing sheets, each of said sheets being releasably bonded to said other sheets along substantially all of said perimeter of said pad provided, however, a selected portion of said perimeter is unbonded;

sheet separation means proximate said selected unbonded perimeter portion whereby said user can grasp and remove at least one sheet from said pad, said sheet separation means comprising a truncated corner of said pad, said sheet being unbonded at said truncated corner and along at least a portion of at least one side edge of said pad adjacent truncated corner and said base further defining a finger hole proximate and at least partially overlaid by said truncated corner thereby facilitating the grasping and removing of the last few sheets of said pad; and clip means attached to said base for releasably securing said mixing instrument to said palette when said mixing instrument is not being used.

* * * * *